(12) United States Patent
Prate et al.

(10) Patent No.: US 11,085,650 B2
(45) Date of Patent: Aug. 10, 2021

(54) SLIDABLE MOUNTING BLOCK FOR INSERTION INTO A RAIL, FIXING ARRANGEMENT FOR A TECHNICAL INSTALLATION AND THEIR USE

(71) Applicant: Uponor Innovation AB, Virsbo (SE)

(72) Inventors: Richard Prate, Oslo (NO); Mattias Carlsson, Vasteras (SE); Thomas Strand, Vasteras (SE)

(73) Assignee: Uponor Innovation AB, Virsbo (SE)

( * ) Notice: Subject to any disclaimer, the term of this patent is extended or adjusted under 35 U.S.C. 154(b) by 8 days.

(21) Appl. No.: 16/446,540

(22) Filed: Jun. 19, 2019

(65) Prior Publication Data

US 2020/0103123 A1 Apr. 2, 2020

(30) Foreign Application Priority Data

Sep. 28, 2018 (EP) ..................................... 18197628

(51) Int. Cl.
*F24D 3/12* (2006.01)
*F16B 37/00* (2006.01)
(Continued)

(52) U.S. Cl.
CPC ............ *F24D 3/125* (2013.01); *F16B 37/005* (2013.01); *F16B 37/046* (2013.01); *F16L 3/16* (2013.01); *F24D 3/141* (2013.01); *F24D 3/146* (2013.01)

(58) Field of Classification Search
CPC .......... F16B 2200/205; F16B 2200/403; F16B 37/045; F16B 37/046; F16B 7/187; F16L 3/243; F24D 3/125; F24D 3/141
(Continued)

(56) References Cited

U.S. PATENT DOCUMENTS

| 4,568,050 A | 2/1986 | Radoy et al. |
| 5,104,270 A | 4/1992 | Ritzl |

(Continued)

FOREIGN PATENT DOCUMENTS

| DE | 06750452 U | 1/1969 |
| GB | 02385898 A | 9/2003 |

OTHER PUBLICATIONS

EP 18197628.3—European Extended Search Report dated Apr. 1, 2019, 7 pages.

(Continued)

*Primary Examiner* — Bradley Duckworth
(74) *Attorney, Agent, or Firm* — Haynes Beffel & Wolfeld LLP; Andrew L. Dunlap

(57) ABSTRACT

The present invention relates to a slidable mounting block for insertion into a rail having a partially closed profile, the mounting block having a front face and a rear face opposite to the front face, the front face facing an open part of the partially closed profile when inserted into the rail. The mounting block comprises a first hole accessible from the front face in a first fixing area of the mounting block and configured for screwing in a threaded part of a first fastener, a recess accessible from the rear face in a second fixing area of the mounting block and configured for holding a head of a second fastener, and a second hole accessible from the front face in the second fixing area, the second hole being co-aligned with the recess and configured for passing a shaft of the second fastener through the mounting block.

19 Claims, 10 Drawing Sheets

(51) Int. Cl.
  *F16L 3/16* (2006.01)
  *F24D 3/14* (2006.01)
  *F16B 37/04* (2006.01)
(58) Field of Classification Search
  USPC .......................................................... 411/85
  See application file for complete search history.

(56) References Cited

U.S. PATENT DOCUMENTS

| | | | |
|---|---|---|---|
| 5,110,080 A | 5/1992 | Rieman | |
| 8,182,183 B2* | 5/2012 | Cook | F16B 37/045 |
| | | | 410/105 |
| 8,353,649 B2* | 1/2013 | Csik | F16B 39/284 |
| | | | 411/111 |
| 8,444,342 B2 | 5/2013 | Stauss | |
| 8,465,242 B2* | 6/2013 | Arendt | F16B 7/187 |
| | | | 411/551 |
| 10,408,252 B2* | 9/2019 | Reznar | F16B 37/046 |
| 10,655,661 B2* | 5/2020 | Nijdam | F16B 37/045 |
| 2015/0316085 A1 | 11/2015 | Zhang et al. | |

OTHER PUBLICATIONS

EP 18197628.3—Response to European Extended Search Report dated Apr. 1, 2019 filed Sep. 18, 2020, 24 pages.

* cited by examiner

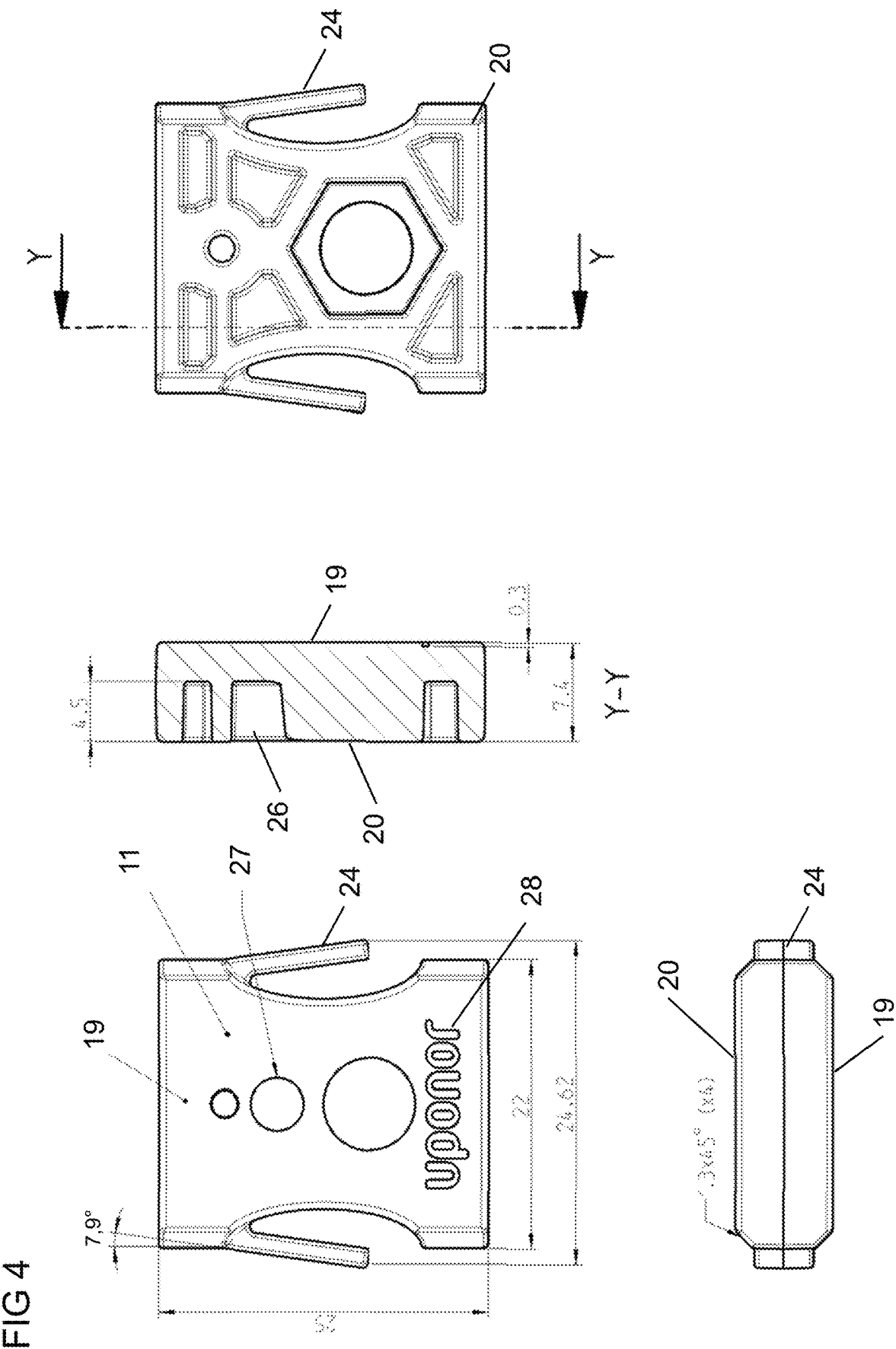

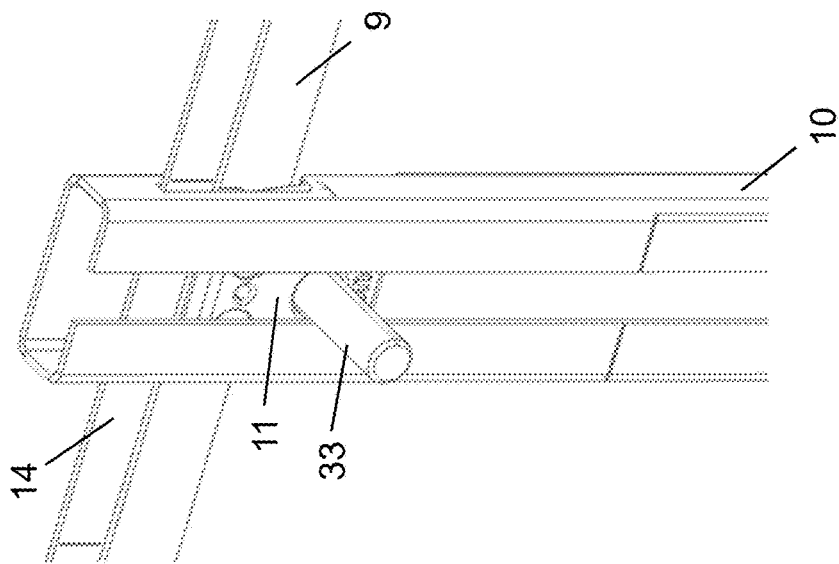
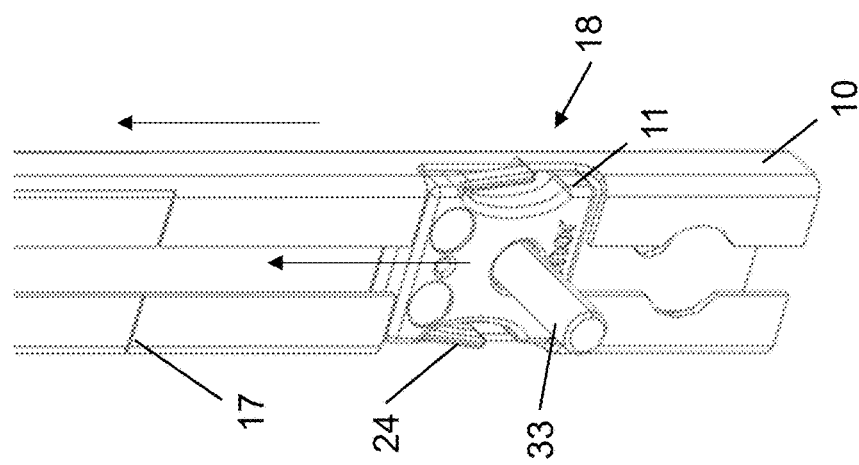
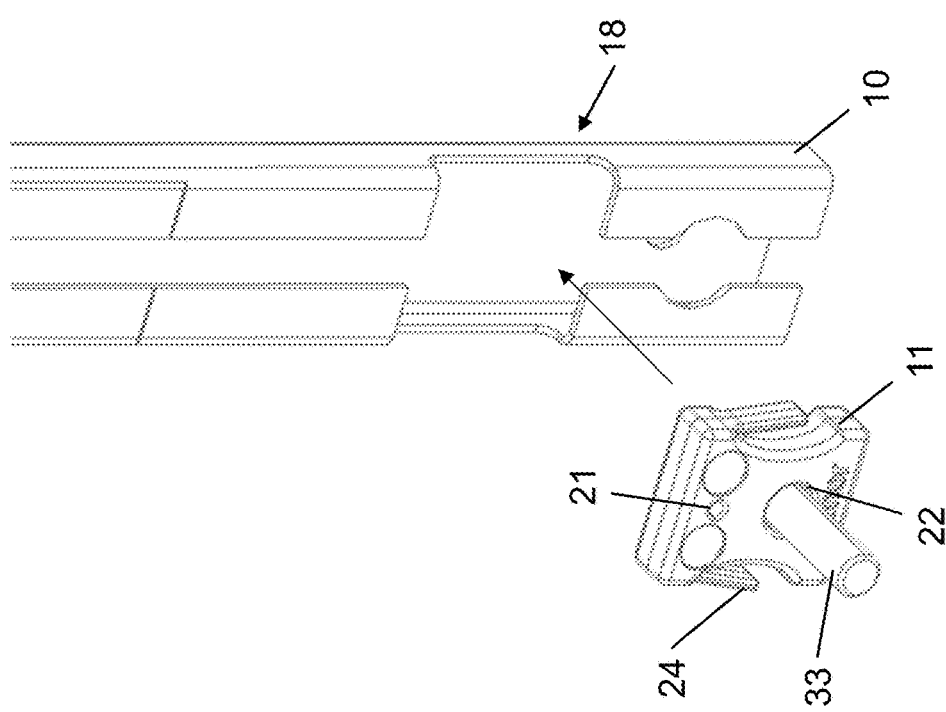

SLIDABLE MOUNTING BLOCK FOR INSERTION INTO A RAIL, FIXING ARRANGEMENT FOR A TECHNICAL INSTALLATION AND THEIR USE

CROSS-REFERENCE

This application claims the benefit of and priority to European Application No. 18197628.3, filed 28 Sep. 2018. The priority application is incorporated by reference herein.

DESCRIPTION

Slidable mounting block for insertion into a rail, fixing arrangement for a technical installation and their use.

FIELD OF THE INVENTION

The present invention relates to a slidable mounting block for insertion into a rail having a partially closed profile. It further relates to a fixing arrangement for the fixation of a pipe and/or other elements of a technical installation comprising at least one rail and at least one slidable mounting block. The invention further relates to a use of a slidable mounting block in such a fixing arrangement to fix a plurality of pipes to a manifold or a mixer of a technical installation, in particular an underfloor, ceiling or wall heating and/or cooling installation.

BACKGROUND OF THE INVENTION

Various fixing arrangements for the fixation of pipes and other parts of technical installations are known from the prior art. In particular with regard to underfloor heating installations, a relatively large number of pipes need to be connected, typically within an installation cabinet, to connect and control the various heating circuits embedded in various parts of a floor of a building. Since building designs differ significantly and comprise different numbers and types of heating circuits, a great degree of flexibility is required to install the corresponding elements of the technical installation.

One way of addressing this need for flexibility is the mounting of pipes and other elements of a technical installation using perforated rails. One or more perforated rails can be fixed inside an installation cabinet. The individual elements of the technical installation can then be attached to the perforated rails by means of bolts or screws.

However, such an approach has various disadvantages. For example, once a particular perforated rail is chosen, the spacing and diameter of the individual holes is fixed. Moreover, if bolts are to be used to fix various installation elements, it may be difficult to later add further bolts to a perforated rail already attached to the back wall of a cabinet.

Accordingly, one objective underlying the present invention is to provide devices and systems which allow a more flexible assembly of technical installations, in particular technical installations relating to heating and/or cooling circuits of a building.

BRIEF DESCRIPTION OF THE INVENTION

According to a first aspect of the present invention, a slidable mounting block for insertion into a rail having a partially closed profile is provided. The slidable mounting block has a front face and a rear face opposite to said front face, the front face facing an open part of the partially closed profile when inserted into the rail. The slidable mounting block comprises a first hole accessible from the front face in a first fixing area of the mounting block and configured for screwing in a threaded part of a first fastener, a recess accessible from the rear face in a second fixing area of the mounting block and configured for holding a head of a second fastener, and a second hole accessible from the front face in the second fixing area of the mounting block, the second hole being co-aligned with the recess and configured for passing a shaft of the second fastener through the mounting block.

Such a mounting block has the advantage that an installer may choose one of two different fixing areas with associated different fastening means to attach elements of a technical installation to the mounting block. In particular, the first hole can be used to attach a first fastener by screwing a male, threaded part of the first fastener, such as a the tip of a self-tapping screw, into the first hole. Alternatively or in addition, the second fixing area can be used to hold a second fastener with a head, such as a bolt, which may then be used to attach an element of a technical installation by means of a nut or similar fastening device. Moreover, since the mounting block is slidable within a partially closed rail, its position can be freely adjusted. The second fastener can alternatively be composed of two or more parts, e.g. a nut and a threaded shaft, which can be inserted into the second hole and screwed into the nut. In this regard, the nut defines the head of the second fastener. In other words, the second fastener comprises a head and a bolt, which are integrally connected such that the second fastener is made of one piece. Alternatively, the second fastener comprises two or more separate components, which may be coupled and mounted to form the second fastener.

In at least one embodiment, the mounting block further comprises at least one spring arm configured for holding the slidable mounting block within the partially closed profile when inserted into the rail. Such an embodiment makes sure that the slidable mounting block can be positioned at a desired installation position before the respective element is attached to it.

In at least one embodiment, the mounting block is formed by moulding from a plastic material, in particular a polymer material, such as polyamide. Polymer materials, such as polyamide 66, can be easily moulded into a desired shape. Moreover, other properties of a polymer material, such as its hardness, can be chosen to suit the needs of the intended fasteners, for example self-tapping screws.

According to a second aspect of the present invention, a fixing arrangement for the fixation of a pipe and/or other elements of a technical installation is provided. The fixing arrangement comprises at least one first rail having a partially closed profile for holding a plurality of slidable mounting blocks and at least one slidable mounting block, for example, a mounting block according to the first aspect.

Such a fixing arrangement allows the positioning of various mounting blocks at different positions within a common rail and therefore provides a very flexible means of attaching a multiple elements of a technical installation to the rail.

In at least one embodiment, the at least one first rail has a C-shaped profile and the at least one slidable mounting block is arranged in the rail such that its front face faces the open part of the C-shaped profile and its rear face faces the closed part of the C-shaped profile. In this way, fixing areas of the slidable mounting blocks remain accessible after the rail has been attached to a wall or installation cabinet.

According to at least one embodiment, the at least one rail comprises a cut-out configured to insert the at least one slidable mounting block into the partially closed profile when the rail is fixed with its back side to a mounting surface of a building or cabinet. Such a fixing arrangement allows the later addition of further mounting blocks into a rail already attached at an installation site.

In at least one embodiment, the fixing arrangement further comprises at least one second rail, wherein, in a mounted state, the first rail is fixed to the second rail and the first rail and the second rail are arranged perpendicularly. Such an arrangement provides a two-dimensional rail system that allows the adaptation of the fixing arrangement to desired fixing positions on a mounting surface.

In at least one embodiment, the first rail comprises a clip, and the second rail has an S-, Z- or hook-shaped profile comprising a mounting part and a protruding part and is configured such that, when the mounting part of the second rail is mounted to a mounting surface of a building or cabinet, the clip of the first rail can be attached to the protruding part of the second rail. Such a configuration has the advantage that the second rail can be attached to a mounting surface of a building or cabinet first, before the first rail is attached and positioned with respect to the second rail, for example by hanging the first rail from the protruding part of the second rail.

In at least one embodiment, the first rail and the second rail can be attached to each other by means of the slidable mounting block fixed at a predetermined position within the first rail by means of a fastener attached to the at least one slidable mounting block, such that the slidable mounting block secures the clip of the first rail at the protruding part of the second rail.

In at least one embodiment, the first and/or the second rail comprise a plurality of marks arranged at regular intervals. Such marks can be used to provide a one or two dimensional coordinate system for fixing several mounting blocks and elements of the technical installation to be attached thereto in desired positions.

According to a third aspect, a slidable mounting block according to the first aspect and/or a fixing arrangement according to the second aspect, can be used to fix a plurality of pipes to a manifold, a mixer or other element of a technical installation, in particular one of an underfloor, ceiling or wall heating and/or cooling installation.

As detailed below with respect to the various disclosed embodiments, the provided devices and systems allow a particularly flexible fixation of elements of a technical installation within a building. In addition, they allow a very easy and convenient assembly of the fixing arrangement itself, which also allows the prefabrication of an preconfigured assembly, before the assembly is actually attached to a wall or other mounting surface of the building.

The invention is described below in more detail with respect to various embodiments shown in the attached figures.

BRIEF DESCRIPTION OF THE DRAWINGS

FIG. 4 shows isometric views of the mounting block according to FIG. 3.

FIGS. 5A, 5B, 5C, 5D, 5E, 5F, 5G, 5H, 5I and 5J show steps of installing a fixing arrangement according to an embodiment of the present invention.

DETAILED DESCRIPTION OF EMBODIMENTS

Figure 1:
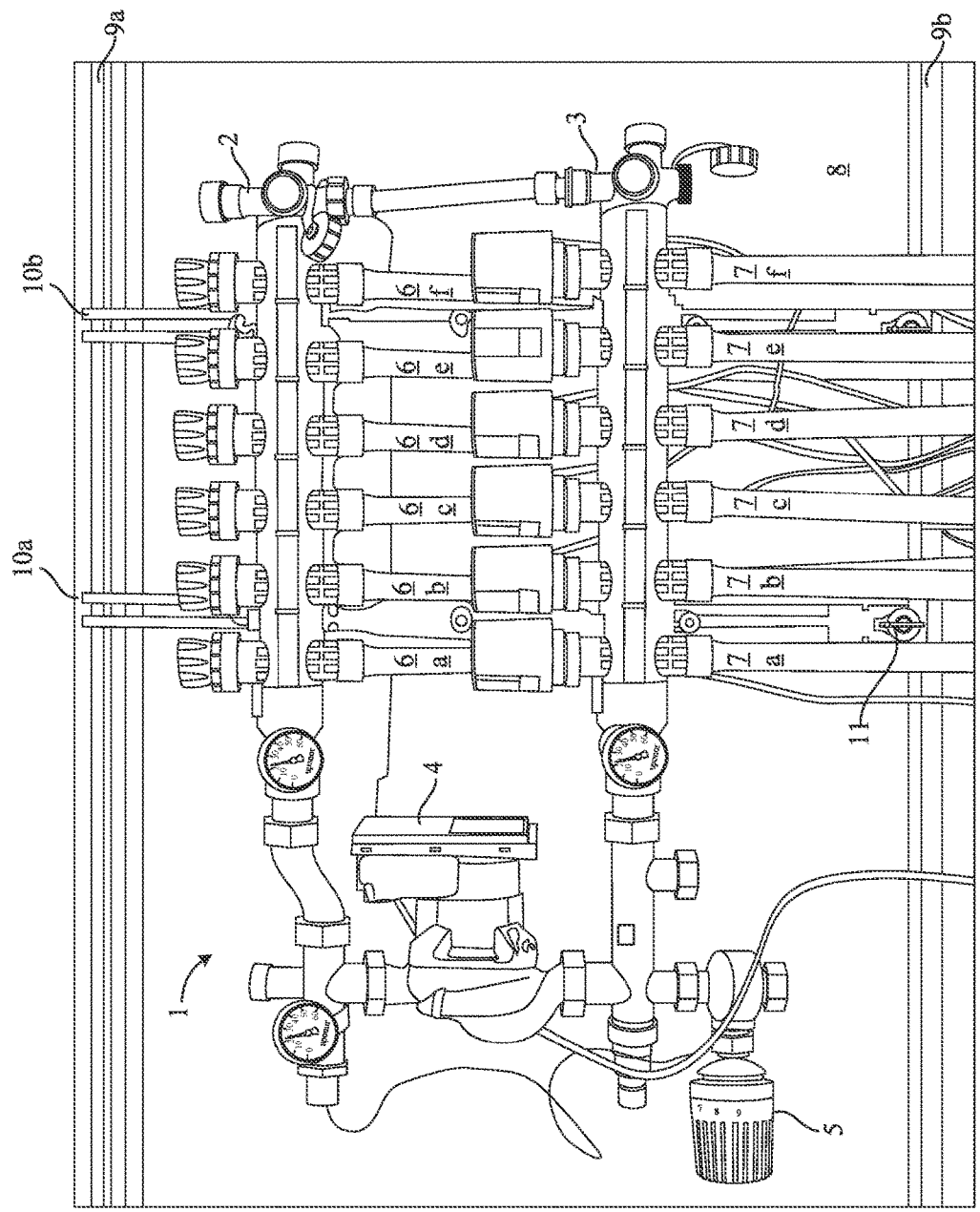
FIG. 1 shows an exemplary pipe installation for an underfloor heating system.

FIG. 1 shows an exemplary pipe installation 1 on a wall of a building for connecting pipes of an underfloor heating system. The pipe installation 1 comprises a feed line manifold 2, a return line manifold 3, a recirculation pump 4 and a thermostat 5. The feed line manifold 2 is connected to six different feed pipes 6a to 6f and the return manifold 3 is connected to six corresponding return pipes 7a to 7f The pipe installation 1 comprises various other elements such as temperature sensors, thermometers, control lines and mixing devices, which are not described in further detail here as they are known to the skilled person.

The pipe installation 1 is affixed to a mounting surface 8 at a construction site, for example to the back wall of an installation cabinet or a wall of a building, by means of two horizontal rails 9a and 9b and two vertical rails 10 and 10b. Although not clearly visible in FIG. 1, the manifolds 2 and 3 are attached to the vertical rails 10a and 10b by means of slidable mounting blocks. Another two slidable mounting blocks 11 are clearly visible at the bottom of the vertical rails 10a and 10b and are used to attach the vertical rails 10a and 10b to the lower horizontal rail 9b.

In the following, the configuration of the mounting blocks 11 and the overall fixing arrangement will be described in more detail with regard to FIGS. 2 to 6.

Figure 2:
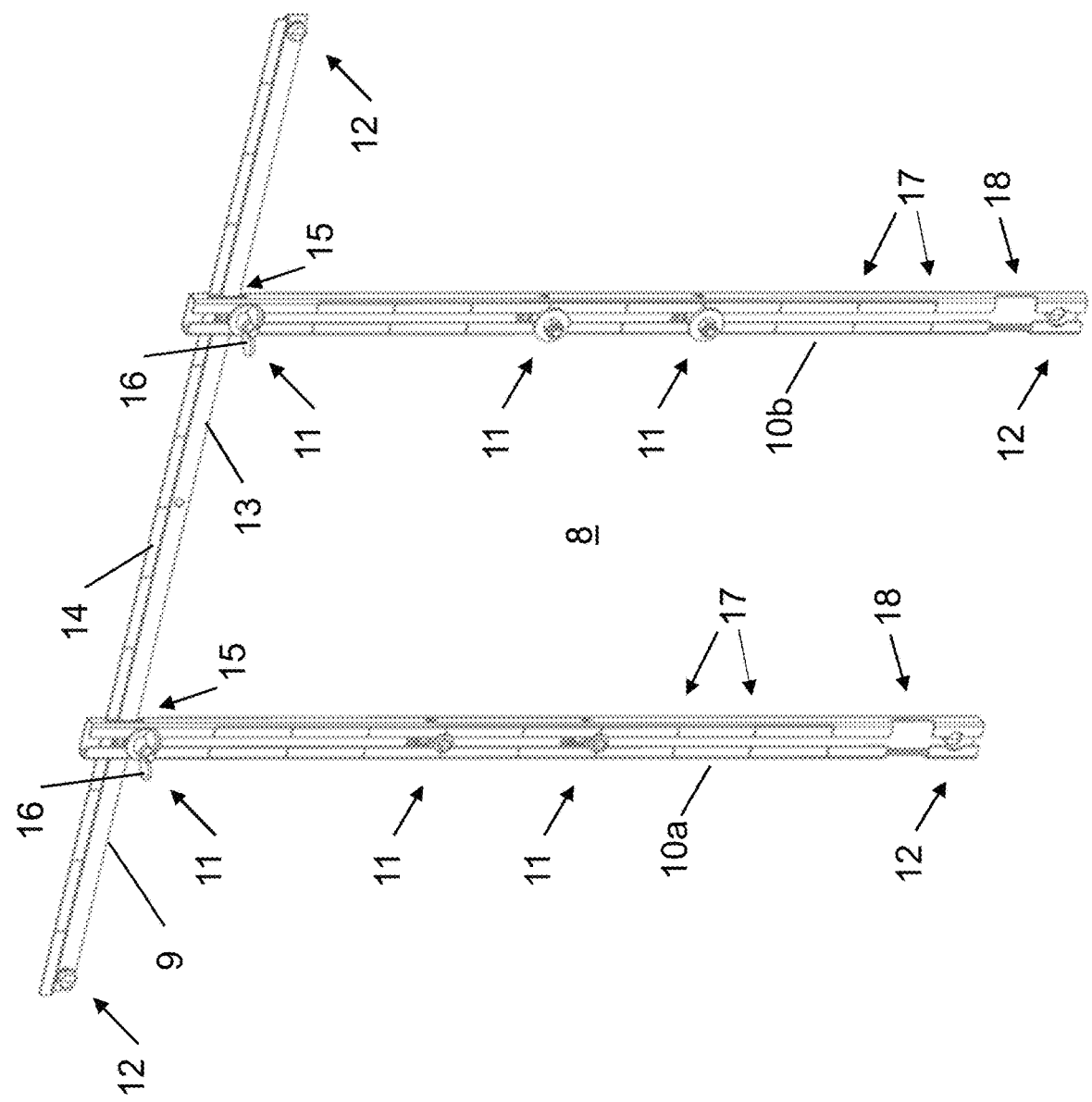
FIG. 2 shows a fixing arrangement according to an embodiment of the present invention.

FIG. 2 shows a fixing arrangement comprising one horizontal rail 9 and two vertical rails 10a and 10b. In the described embodiment, the horizontal rail 9 has a hook- or S-shaped profile, with the lower, flat mounting part 13 being attached to the mounting surface 8 of the building site by means of two screws 12. The horizontal rail 9 further comprises a protruding part 14. Each of the vertical rails 10a and 10b has a corresponding opening 15, which allows them to be hung onto the protruding part 14 of the horizontal rail 9. The vertical rails 10a and 10b are fixed to the horizontal rail 9 by means of two wingnut screws 16 and corresponding washers that are attached to a corresponding shaft of a bolt hidden in the view shown in FIG. 2. The bolt head is embedded in a mounting block, also covered from view, which pushes against the protruding part 14 of the horizontal rail 9 from below. In the embodiment shown in FIG. 2, the vertical rails 10a and 10b are additionally attached directly to the mounting surface 8 by means of two further screws 12 arranged at the bottom of the vertical rails 10a and 10b. Other means of fixation, such as the provision of a further horizontal rail and corresponding mounting blocks as shown in FIG. 1 are also possible.

As shown in FIG. 2, both the horizontal rail 9 as well as the vertical rails 10a and 10b comprise equally spaced marks 17, which essentially define a two-dimensional coordinate system for the fixing arrangement. Using said marks 17, further mounting blocks 11 can be positioned at desired locations within the essentially C-shaped profile of the vertical rails 10a and 10b. The mounting blocks 11 can then be used to attach further elements of a technical installation, such as the manifolds 2 and 3 shown in FIG. 1, to the fixing arrangement shown in FIG. 2. In the described embodiment, the vertical rails 10a and 10b comprise a cut-out 18 near the lower end of the vertical rails 10a and 10b, which allow the insertion of further mounting blocks 11 into the partially closed profile.

Figure 3:
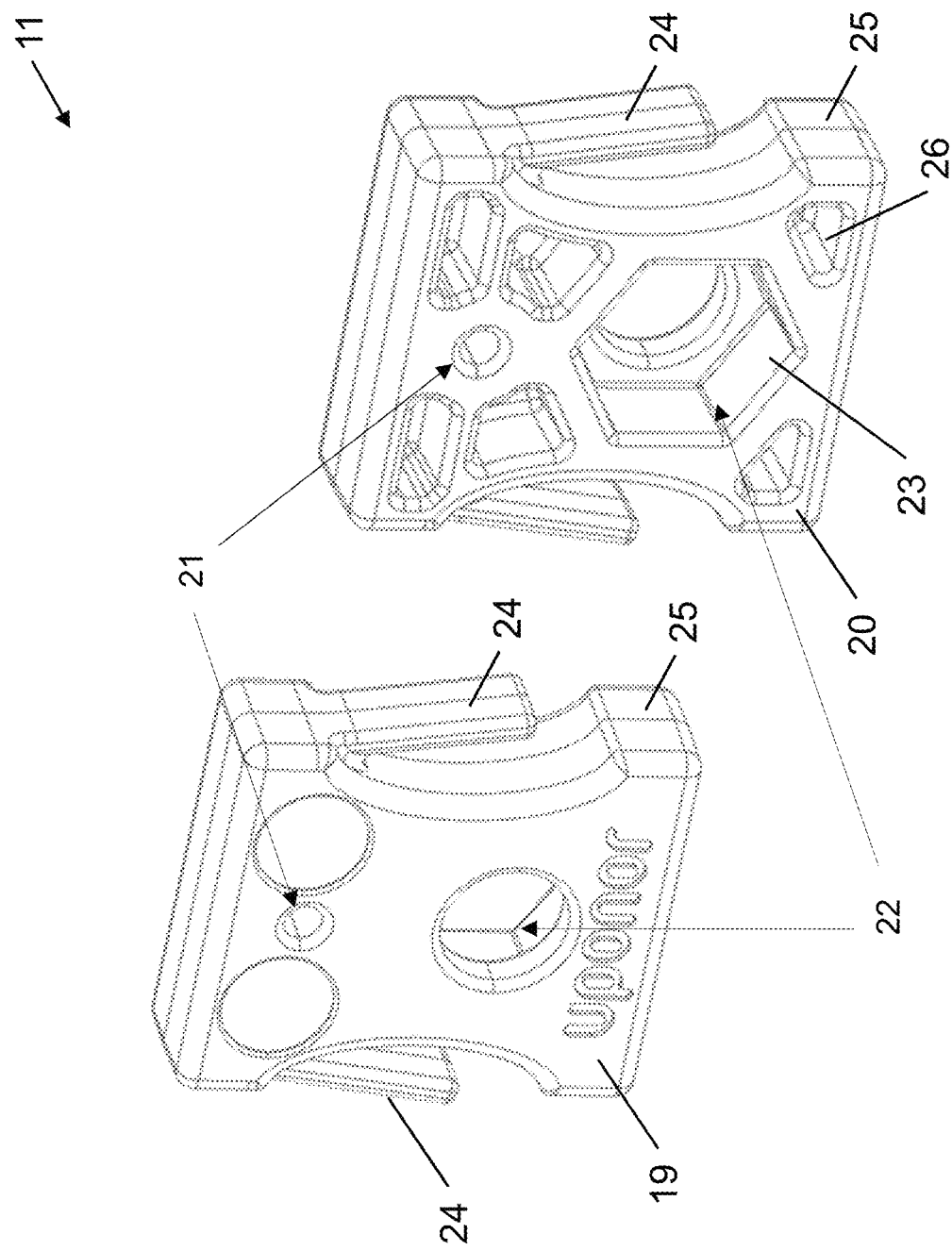
FIG. 3 shows a perspective front and back view of a mounting block according to an embodiment of the present invention.

FIGS. 3 and 4 show different views of a mounting block 11 in accordance with an embodiment of the present invention. Turning to FIG. 3 first, the mounting block 11 comprises a front face 19 shown in the left part of FIG. 3 and a rear face 20 shown in the right-hand part of FIG. 3. The front face 19 of the mounting block 11 comprises a first hole 21 with a smaller diameter, for example 2 mm, and a second hole 22 with a larger diameter, for example 6 mm. Both holes 21 and 22 are arranged along a central vertical axis of the front face 19, which corresponds with an opening of the partially closed profile of the vertical rails 10. That is to say, the holes 21 and 22 remain accessible when the mounting block is inserted into one of the vertical rails 10.

The first hole 21 is arranged in a first fixing area corresponding to the upper part of the mounting block 11 and the second hole 22 is arranged in a second fixing area corresponding to its lower part. As can be seen in the right half of FIG. 3, the first hole 21 extends all the way to the rear face 20 of the mounting block 11. In contrast, the second hole 22 extends to the back wall of a recess 23 in the shape of a hexagonal prism arranged on the rear face 20. As will be described later, the recess 23 is configured to receive a hexagonal head of a bolt, whose shaft is pushed through the second hole 22 from the rear face 20 towards the front face 19 of the mounting block 11. In the described example, the distance between two opposite side walls of the recess 23, corresponding to a wrench size for a corresponding bolt head, is 10 mm. In an alternative embodiment, the recess 23 is configured to receive a hexagonal nut, into which a threaded shaft can be screwed.

The mounting block 11 further comprises two spring arms 24 arranged at opposite side faces 25 perpendicular to the front face 19 and the rear face 20. If the mounting block 11 is inserted into the profile of the vertical rail 10, in the absence of external forces, the spring arms 24 hold the mounting block 11 at a desired mounting position.

Finally, FIG. 3 also shows that the rear face 20 of the mounting block 11 comprises a number of depressions 26. The depressions 26 reduce the amount of material required to form the mounting block 11 and also allow to obtain a smoother front face 19 during a moulding process.

FIG. 4 shows isometric, dimensioned views of the mounting block 11 shown in FIG. 3, as well as a cross-section along an axis Y-Y. As can be seen in FIG. 3, the front face 19 of the mounting block 11 may also comprises a manufacturing date marking 27 as well as a brand marking 28. Of course, the mounting block 11 may comprise further marks indicating various information about the mounting block 11, such as the diameter or type of the fasteners to be used in combination with the first hole 21 and/or the second hole 22. However, in the described embodiment, the size information is colour-coded by colouring the bodies of mounting blocks 11 for different diameter screws and bolts with different colours. For example, for a bolt with a 10 mm bolt head and shaft with a M6 thread, the body of the mounting block 11 is formed from blue polyamide 66. Other mounting blocks, e.g. for use with M5- or M8-type bolts may be made from red and green polyamide, for example.

FIGS. 5A to 5J show steps for assembling a fixing arrangement for a technical installation, such as the fixing arrangement shown in FIG. 2.

Figure 5A:
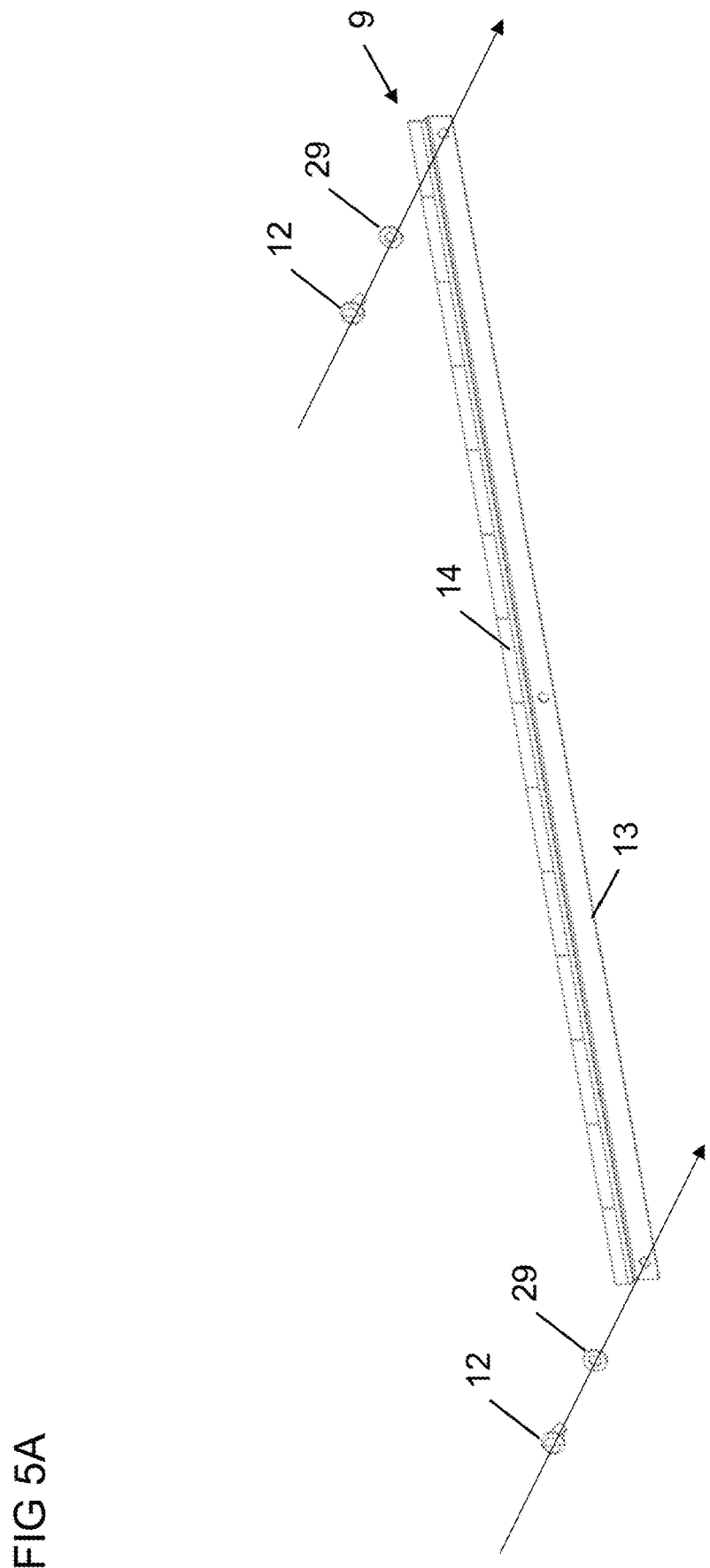

In a first step shown in FIG. 5A, a horizontal rail 9 is attached to a mounting surface 8, not visible in FIG. 5A, by means of two screws 12 and two corresponding washers 29.

In FIG. 5A, the mounting part 13 of the horizontal rail 9 faces towards the observer, whereas the protruding part 14 is arranged in parallel and at a distance from the mounting surface 13.

Figure 5D:
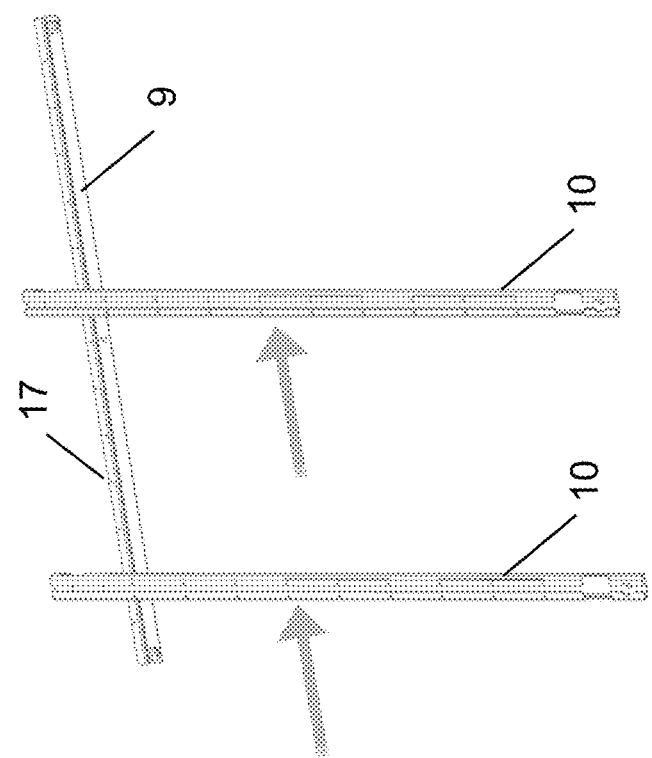
Figure 5C:
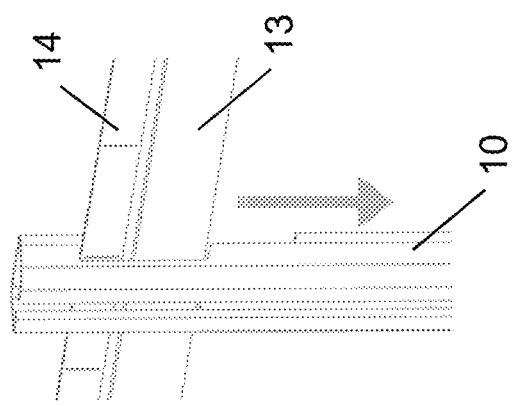
Figure 5B:
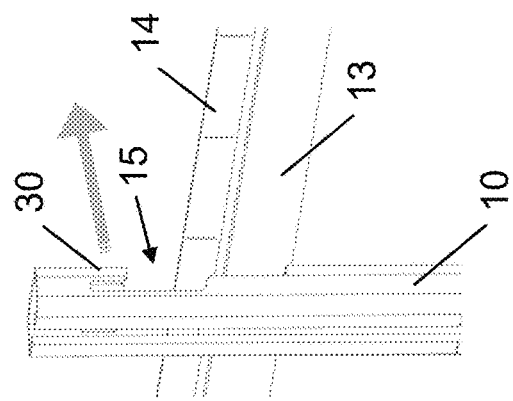

FIGS. 5B and 5C show the attachment of a vertical rail 10 to the horizontal rail 9 already attached to the mounting surface 8. As can be seen in FIG. 5B in particular, the vertical rail 10 comprises a clip 30 at the upper end of the opening 15. The protruding part 14 of the horizontal rail 9 can be inserted via the opening 15 into a slit formed between the clip 30 and the frontal part of the partially closed profile of the vertical rail 10. Once the vertical rail 10 is lowered as shown in FIG. 5C, it hangs from the protruding part 14 of the horizontal rail 9. In this state, each vertical rail 10 can be easily moved in a horizontal direction as shown in FIG. 5D. Marks 17 on the protruding part 14 of the horizontal rail 9 help the installer to align the vertical rails 10 in a desired horizontal position. In the described example, the spacing between the horizontal marks 17 corresponds to the spacing of pipe connectors of the manifolds 2 and 3.

Figure 5E:
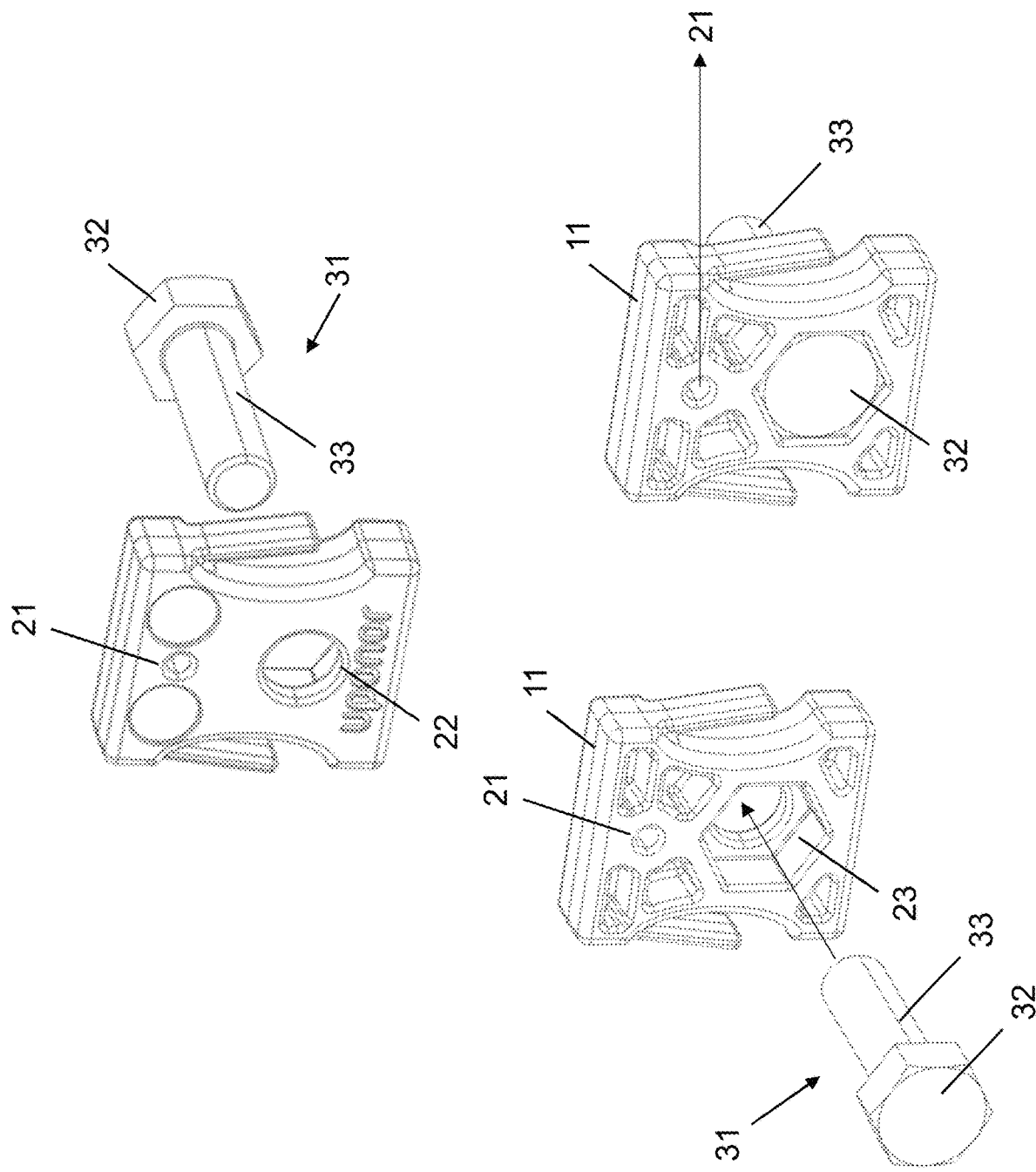
Figure 5I:
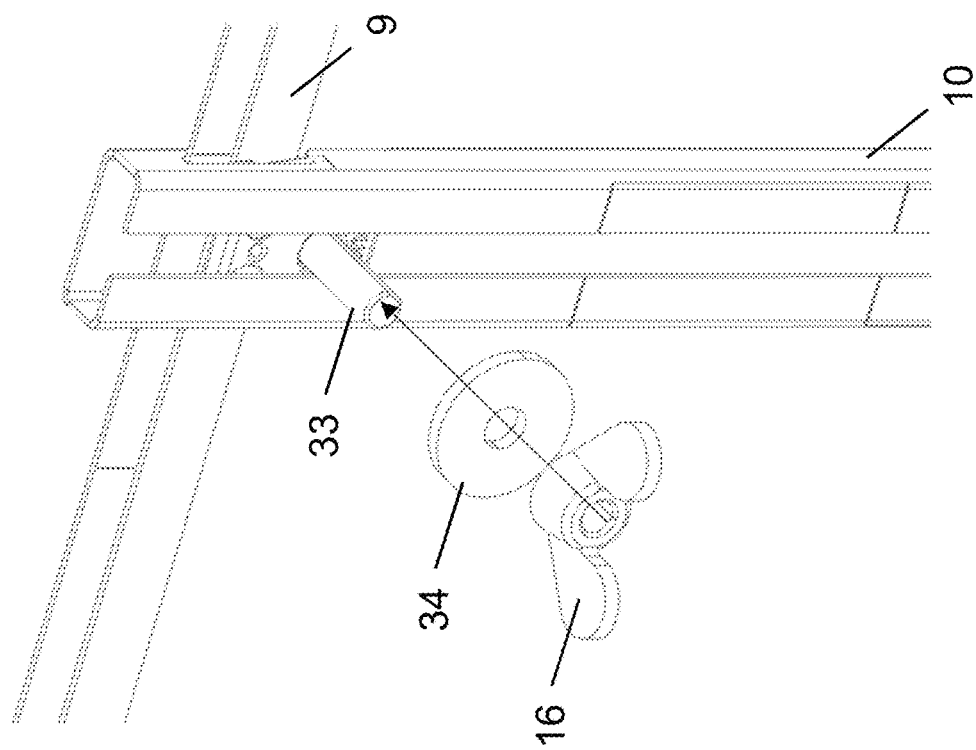

FIG. 5E shows the preparation of a mounting block 11 for affixing further parts to the rail assembly. In the described example, M6-type bolts 31 are used as fasteners. Each bolt 31 comprises a bolt head 32 and a shaft 33. A part or all of the shaft 33 is threaded, although this is not shown in FIG. 5E. As shown, the shaft 33 of the bolt 31 is pushed from the rear face 20 of the mounting block 11 through the second hole 22 in the lower, second fixing area. In its final position, the bolt head 32 is positioned entirely in and held by the recess 23 of the mounting block 11. As indicated above, in an alternative embodiment (not shown) a hexagonally shaped nut can be inserted into the recess 23 and a shaft, which is at least partially threaded, is pushed from the front face 19 through the second hole 22 and screwed into the nut.

In this state, the mounting block can be inserted into the vertical rail 10 by means of the cut-out 18, as shown in FIG. 5F. The cut-out 18 is sufficiently large that the entire body of the mounting block 11 can be put into the profile from the front side of the vertical rail 10 already attached to the mounting surface 8. In this state, shown in FIG. 5G, the spring arms 24 of the mounting block 11 extend sideward from the cut-out 18. If the mounting block 11 is then pushed upwards within the hollow channel of the vertical rail 10 as shown in FIG. 5H, the spring arms 24 are compressed and hold the mounting block 11 at a desired position.

Figure 5J:
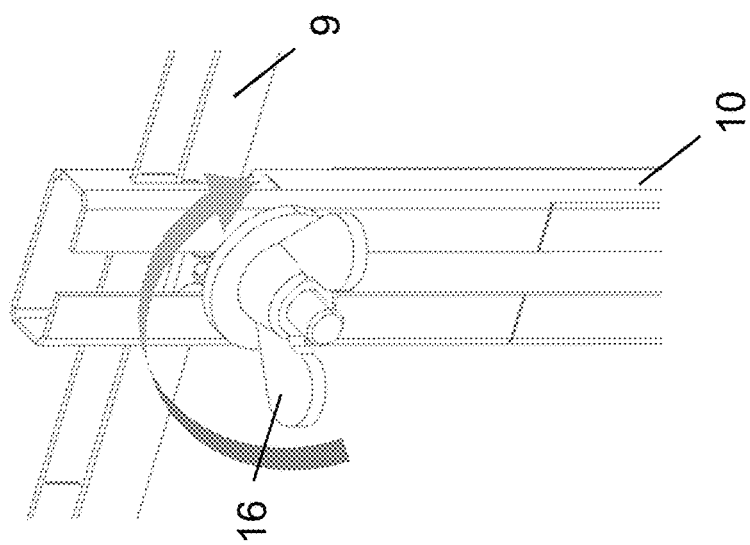

The position depicted in FIG. 5H is particularly useful for fixing the position of the vertical rail 10 with respect to the horizontal rail 9. As further shown in FIG. 5I, the mounting block 11 presses from underneath against the protruding part 14 of the horizontal rail 9. In this position, the mounting block 11 can be fixed by means of a wing nut 16 and a further washer 34 that are screwed onto the threaded part of the bolt 31 as shown in FIG. 5J.

Above the use of the mounting block 11 in combination with a bolt 31 used as fastener has been described. However, as described with respect to FIGS. 3 and 4, the same mounting block 11 may also be used in combination with other fasteners, such as self-tapping screws.

Figure 6C:
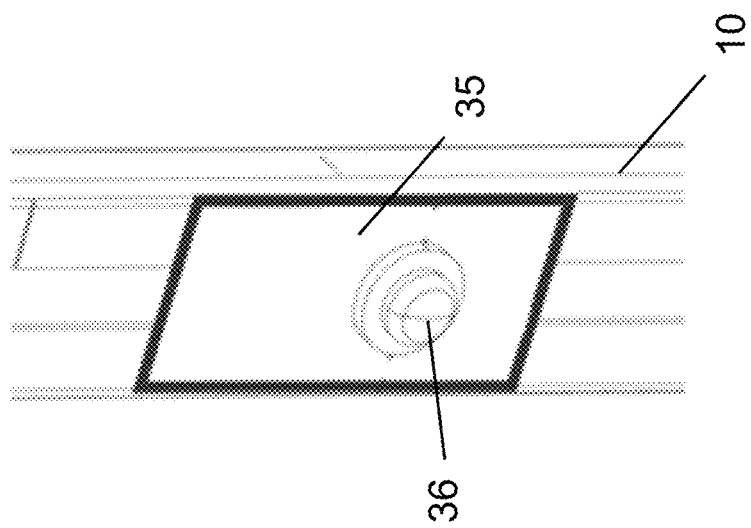
FIGS. 6A, 6B and 6C show the use of a different fastener according to another embodiment of the invention.
Figure 6B:
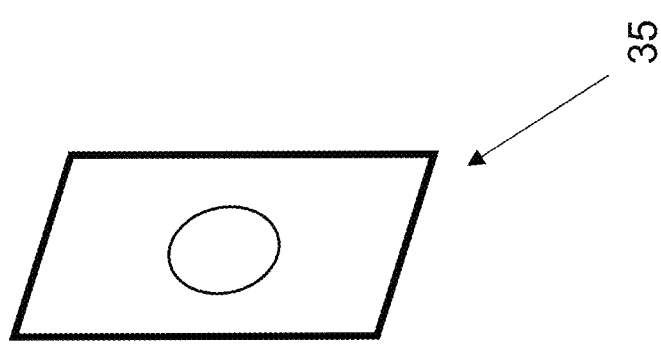
Figure 6A:
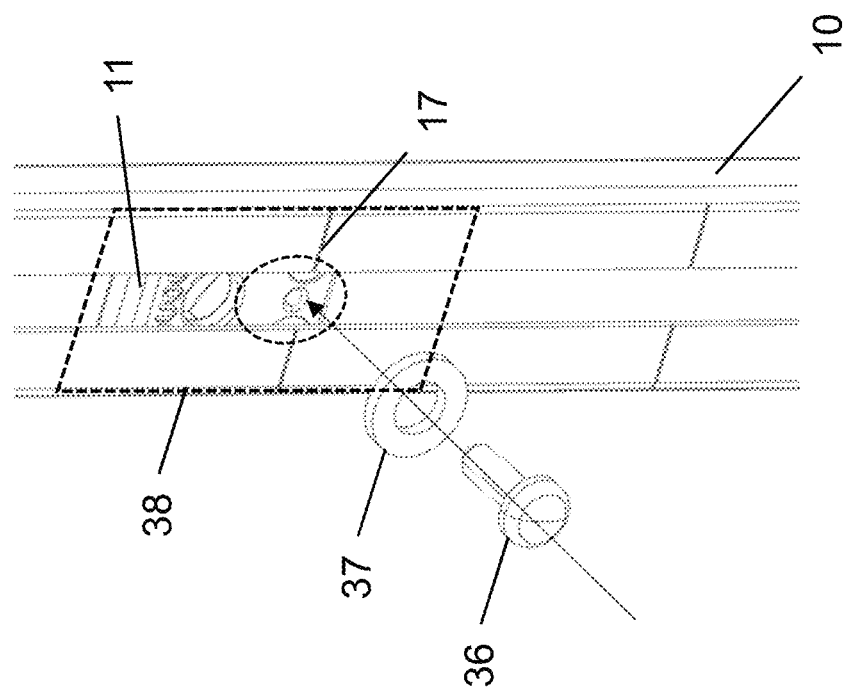

FIGS. 6A to 6C show the use of the same mounting block 11 placed in a vertical rail 10 to fix a clamping or base plate 35 by means of a self-tapping screw 36 and a washer 37. As before, the mounting block 11 is arranged at a desired vertical position first. As shown in FIG. 6A, this may be achieved by aligning the first hole 21 of the mounting block 11 with one of the marks 17 placed, for example, every 50 mm along the frontal part of the partially closed profile of the vertical rail 10. The base plate 35 is then arranged at the desired mounting position 38 and secured with the self-tapping screw 36 and washer 37 as shown in FIG. 6C. If required, the mounting block 11 can be inserted upside down into the vertical rail 10 as shown in FIG. 6A, to arrange the first hole 21 at a lower end of the mounting block 11.

So far the step-by-step assembly of the fixing arrangement has been described. However, contrary to existing solutions, the rail assembly described above can also be pre-mounted before it is fixed at an installation site. For example, various parts of the fixing arrangement or even part of a technical installation can be mounted against one or more vertical rails 10 using various mounting blocks 11 as described with regard to FIGS. 5B to 5J. At a later stage, the topmost mounting blocks 11 may be loosened to remove a horizontal rail 9. The horizontal rail 9 may then be screwed at a final mounting position within a building site, for example within an installation cabinet for underfloor heating. The entire rail assembly may then be hung onto the horizontal rail 9 and be fixed in place by tightening the wing nut screws 16 of the topmost mounting block 11 as described with regard to FIGS. 5I and 5J.

This approach is particularly useful in the case where a relatively large number of similar technical installations needs to be prepared before being attached at a building site. For example, in high-rise buildings, a similar installation is often used for each floor, apartment or other part of the building.

Attention is also drawn to the fact that the described fixing arrangements can also be used with other types of mounting blocks. In particular, a mounting block having only a single fixing area with a single hole is still useful for implementing the above-described prefabrication method.

Moreover, while the invention has been described with respect to an underfloor heating installation, the inventive mounting block and fixation arrangement may also be used for fixing other types of pipes, such as drinking water, wastewater or gas pipes, or even electrical installations to other parts of a building, such as a ceiling or underfloor installation.

The invention claimed is:

1. A fixing arrangement, comprising:
at least one first rail having a partially closed profile for holding a plurality of slidable mounting blocks; and
at least one slidable mounting block comprising:
at least two spring arms for holding the slidable mounting block within the at least one first rail,
a first hole accessible from a front face of the mounting block in a first fixing area and configured for screwing in a threaded part of a first fastener,
a recess accessible from a rear face of the mounting block in a second fixing area and configured for holding a head of a second fastener, and
a second hole accessible from the front face in the second fixing area of the mounting block, the second hole being co-aligned with the recess and configured for passing a shaft of the second fastener through the mounting block and a corresponding opening of the partially closed profile,
wherein the at least one first rail comprises a plurality of marks arranged at regular intervals in a vicinity of an opening of the partially closed profile, such that the at least one slidable mounting block can be positioned at a desired location within the at least one first rail.

2. The fixing arrangement according to claim 1, wherein the at least one first rail has a C-shaped profile, and the at least one slidable mounting block is arranged in the at least one first rail such that its front face faces an open part of the C-shaped profile and its rear face faces a closed part of the C-shaped profile.

3. The fixing arrangement according to claim 1, wherein the at least one first rail comprises a cut-out configured to insert the at least one slidable mounting block into the partially closed profile.

4. The fixing arrangement according to claim 1, further comprising at least one second rail, wherein, in a mounted state, the first rail is fixed to the second rail and the first rail and the second rail are arranged perpendicularly.

5. The fixing arrangement according to claim 4,
wherein the first rail comprises a clip, and
wherein the second rail has a S-, Z- or hook-shaped profile comprising a mounting part and a protruding part and is configured such that, the clip of the first rail can be attached to the protruding part of the second rail.

6. The fixing arrangement according to claim 5, further comprising at least one fastener attached to the at least one slidable mounting block and configured to fix the at least one slidable mounting block at a predetermined position within the first rail, wherein the at least one slidable mounting block is fixed within the first rail such that it secures the clip of the first rail at the protruding part of the second rail.

7. The fixing arrangement according to claim 4, wherein the at least one second rail comprises a plurality of marks arranged at regular intervals, such that the at least one first rail can be positioned at a desired location of the at least one second rail.

8. The fixing arrangement according to claim 1, wherein the fixing arrangement is used to fix a plurality of pipes to at least one of a manifold, a mixer an underfloor, a ceiling and a wall.

9. A fixing arrangement, comprising:
at least one first rail having a partially closed profile for holding a plurality of slidable mounting blocks;
at least one slidable mounting block comprising:
at least two spring arms for holding the slidable mounting block within the at least one first rail,
a first hole accessible from a front face of the mounting block in a first fixing area and configured for screwing in a threaded part of a first fastener,
a recess accessible from a rear face of the mounting block in a second fixing area and configured for holding a head of a second fastener, and
a second hole accessible from the front face in the second fixing area of the mounting block, the second hole being co-aligned with the recess and configured for passing a shaft of the second fastener through the mounting block and a corresponding opening of the partially closed profile;
at least one second rail, wherein, in a mounted state, the first rail is fixed to the second rail and the first rail and the second rail are arranged perpendicularly; and
at least one fastener attached to the at least one slidable mounting block and configured to fix the at least one slidable mounting block at a predetermined position within the first rail, wherein the at least one slidable mounting block is fixed within the first rail such that it secures a clip of the first rail at a protruding part of the second rail.

10. The fixing arrangement of claim 9, wherein the at least two spring arms are arranged at opposite side faces of the mounting block perpendicular to the front face and the rear face.

11. The fixing arrangement of claim 9, wherein the recess comprises a hexagonal prism for:

holding a hexagonal head of a bolt selected as the second fastener, and a diameter of the second hole is selected such that a shaft of the bolt can be passed through the second hole, or holding a hexagonal nut, and the diameter of the second hole is selected such that a threaded shaft can be passed through the second hole and screwed into the nut, the threaded shaft and the nut defining the second fastener.

12. The fixing arrangement of claim 9, wherein the mounting block is formed by moulding from a plastic material.

13. The fixing arrangement of claim 9, wherein the at least one first rail has a C-shaped profile, and the at least one slidable mounting block is arranged in the at least one first rail such that its front face faces an open part of the C-shaped profile and its rear face faces a closed part of the C-shaped profile.

14. The fixing arrangement of claim 9, wherein the at least one first rail comprises a cut-out configured to insert the at least one slidable mounting block into the partially closed profile.

15. A fixing arrangement, comprising:
at least one first rail having a partially closed profile for holding a plurality of slidable mounting blocks; and
at least one slidable mounting block comprising:
at least two spring arms for holding the slidable mounting block within the at least one first rail,
a first hole accessible from a front face of the mounting block in a first fixing area and configured for screwing in a threaded part of a first fastener,
a recess accessible from a rear face of the mounting block in a second fixing area and configured for holding a head of a second fastener, and
a second hole accessible from the front face in the second fixing area of the mounting block, the second hole being co-aligned with the recess and configured for passing a shaft of the second fastener through the mounting block and a corresponding opening of the partially closed profile; and
at least one second rail,
wherein, in a mounted state, the first rail is fixed to the second rail and the first rail and the second rail are arranged perpendicularly, and
wherein the at least one second rail comprises a plurality of marks arranged at regular intervals, such that the at least one first rail can be positioned at a desired location of the at least one second rail.

16. The fixing arrangement of claim 15, wherein the at least one first rail has a C-shaped profile and comprises a cut-out in its front face configured to insert the at least one slidable mounting block into the C-shaped profile.

17. The fixing arrangement of claim 16, wherein the at least two spring arms are configured to hold the mounting block at a predetermined position within the C-shaped profile.

18. The fixing arrangement of claim 15, wherein a diameter of the first hole is selected such that an inner surface of the first hole is tapped by a threaded part of a self-tapping screw selected as the first fastener.

19. The fixing arrangement of claim 15, wherein the mounting block is made of a polymer material.

* * * * *